United States Patent [19]

Yaver

[11] Patent Number: 4,877,657
[45] Date of Patent: Oct. 31, 1989

[54] DECORATIVE TRIM STRIP WITH ENHANCED DEPTH OF VISION

[75] Inventor: Perry N. Yaver, Brighton, Mich.

[73] Assignee: The D.L. Auld Company, Columbus, Ohio

[21] Appl. No.: 306,049

[22] Filed: Feb. 6, 1989

[51] Int. Cl.⁴ .......................... B60R 13/04; G02B 5/08
[52] U.S. Cl. .......................................... 428/31; 52/716;
   293/128; 428/40; 428/67; 428/187; 428/912.2
[58] Field of Search ...................... 428/31, 40, 67, 187,
                          428/912.2; 52/716; 293/128

[56] References Cited

U.S. PATENT DOCUMENTS

| 4,386,123 | 5/1983 | Coburn, Jr. | 264/246 X |
|---|---|---|---|
| 4,520,053 | 5/1985 | Marentic | 428/31 |
| 4,566,929 | 1/1986 | Waugh | 428/31 X |
| 4,645,556 | 2/1987 | Waugh et al. | 428/31 X |
| 4,671,974 | 6/1987 | Murachi | 428/31 |
| 4,708,894 | 11/1987 | Mabuchi et al. | 428/31 |
| 4,748,062 | 5/1988 | Menjo et al. | 428/31 X |
| 4,759,982 | 7/1988 | Jenssen et al. | 428/31 X |
| 4,781,952 | 11/1988 | Coscia et al. | 428/31 |
| 4,826,713 | 5/1989 | Cook | 428/31 |
| 4,830,892 | 5/1989 | Nussbaum | 428/31 |

Primary Examiner—Henry F. Epstein
Attorney, Agent, or Firm—Killworth, Gottman, Hagan & Schaeff

[57] ABSTRACT

A flexible trim strip especially useful on an automobile's exterior surface provides a decorative appearance with enhanced depth of vision. The trim strip comprises an elongated transparent of translucent core of a plastic material. A bottom surface of the core is covered with an opaque layer and an adhesive layer. A top surface of the core has a thin covering of a metal having a mirror-like appearance with selected portions removed so that a pattern of the underlying opaque layer is revealed. A transparent plastic overlay is formed over the top covering of metal. The overlay has radiused edges to give enhanced depth of vision to the trim strip.

15 Claims, 1 Drawing Sheet

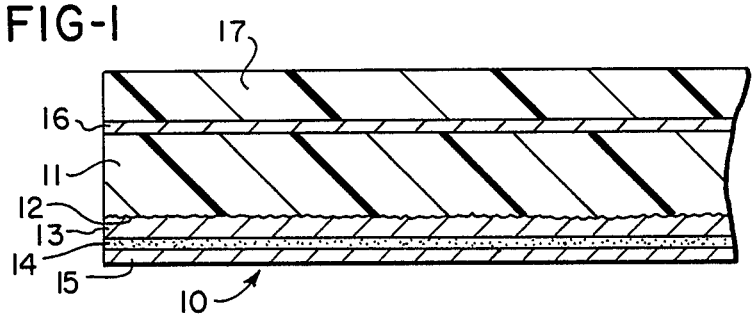
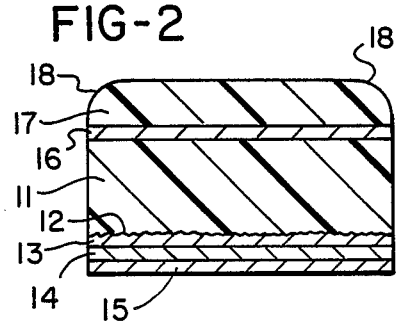
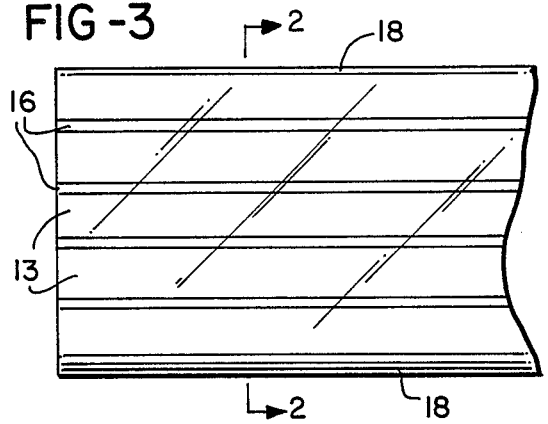
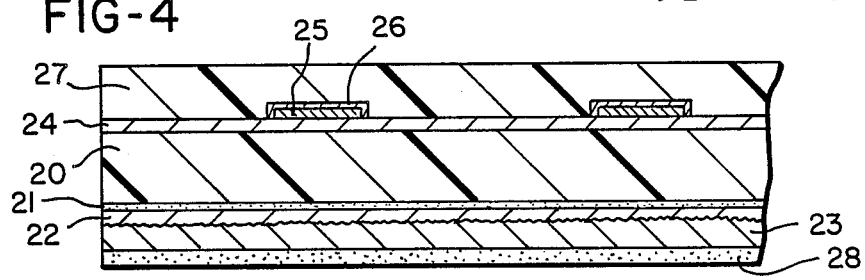
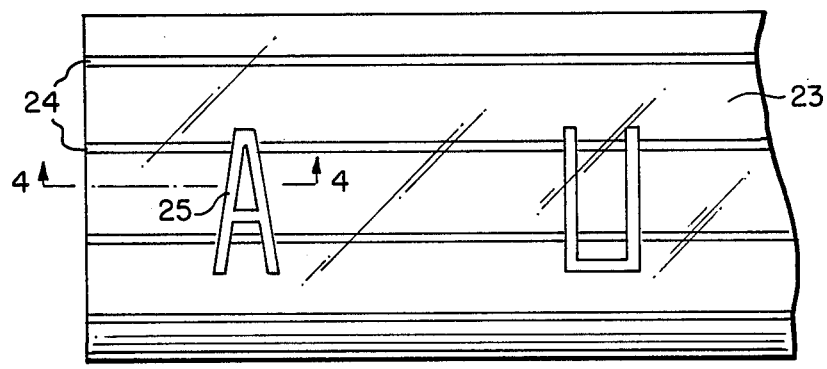

DECORATIVE TRIM STRIP WITH ENHANCED DEPTH OF VISION

BACKGROUND OF THE INVENTION

This invention relates to a decorative trim strip. More particularly, the invention relates to a thin decorative trim strip having an enhanced depth of vision appearance.

Decorative effects of all types have been used to make a substrate more pleasing to the eye. The automotive industry, in particular, has used hood ornaments, decals, and trim strips including fascia trim, body side molding trim and rocker panel trim on the exterior and interior of the automobile's body to create special visual effects. Trim strips for automobiles often tend to be made of a polished metal or at least resemble highly polished metal to give chrome appearance. Such an appearance is desired because of a certain richness it radiates (i.e. the aesthetics). Other trim looks have been used as well wherein special designs, symbols, or letterings have been highlighted.

U.S. Pat. No. 4,566,929, Waugh, describes in detail a unique trim strip which is primarily intended for exterior automotive application. The trim strip is an adhesively applied weather-resistance plastic article of manufacture. It is in the form of an elongated thin plastic molding. Different embodiments provide unique decorative visual effects. All have in common the use of an adhesive layer on a bottom surface and a plastic overlay on a top surface. The plastic overlay or lens cap is formed in a manner which results in radiused edges when hardened. The overlay enhances the decorative attractiveness of the trim strip by giving a lens effect when directly viewed.

Another unique decorative article is disclosed in U.S. Pat. No. 4,520,053, to Marentic. Therein a layered composite is described which displays mirror-like metal areas, patterned areas and graphic areas. The combination of visual effects is obtained from a composite wherein a plastic film is provided on one flat surface with an opaque patterned layer and on an opposite flat surface with a mirror-like metal layer wherein portions of the metal have been removed. Graphics are optionally printed on the top surface. The plastic film is transparent. Accordingly, when viewed directly, one sees the graphics, mirror-like metal portions and (through the transparent film wherein portions of the mirror-like metal layer have been removed) the opaque patterned area. The article is attractive and, with the many different graphics, mirror-like metal designs and opaque patterns available, very versatile.

Examples of still other decorative articles of the nature contemplated herein can be found in U.S. Pat. Nos. 4,386,123, and 4,748,062. Although many such decorative articles are known there is a continued need for new and striking trim strips. Such trim strips must be pleasing to the eye because of some characteristic such as coloring, shape, design, pattern, depth of vision, aesthetics, etc.. Ideally, the strip is pleasingly appealing when viewed, but not so glaring as to detract from the automobile itself. They must also be suitable for application to the exterior or interior of an automobile.

Accordingly, the need remains for new and improved trim strips having an enhanced depth of vision appearance.

SUMMARY OF THE INVENTION

The present invention meets that need by providing a composite flexible trim strip having a decorative appearance with enhanced depth of vision and improved aesthetics. The composite comprises: (1) an optically shaped film substrate having both a mirror-like and patterned surface with an appearance of depth and (2) a clear plastic lens cap overlying the substrate so as to further optically enhance the depth appearance of the mirror-like and patterned surface. The optically shaped film substrate may have a core of an elongated transparent or translucent plastic material having a substantially flat bottom surface and top surface. In order to provide the mirror-like and patterned surface, the bottom surface may be covered with an opaque layer and an adhesive layer and the top surface may have a covering of a thin metal layer having a mirror-like appearance, with selected portions removed to reveal a pattern of the underlying opaque layer. Additionally, for enhanced depth of vision and a unique total appearance, graphics, transparent colors (screened or film overlay) and a clear plastic lens cap in the form of a transparent plastic overlay, having radiused edges to provide a lens effect, cover the thin metal layer.

Accordingly, it is an object of the present invention to provide an improved flexible trim strip especially useful for application to the exterior of an automobile to provide a decorative surface with an enhanced depth of vision and improved aesthetics. This and other objects and advantages of the invention will become apparent from the drawings, the detailed description of the invention and the appended claims.

BRIEF DESCRIPTION OF THE DRAWINGS

FIG. 1 is a side view in section of the trim strip of this invention.

FIG. 2 is a lateral cross-sectional view of the trim strip of FIG. 1.

FIG. 3 is a top view of the trim strip of FIG. 1.

FIG. 4 is a side view in section of another trim strip embodiment of the invention.

FIG. 5 is a top view of the trim strip of FIG. 4.

DETAILED DESCRIPTION OF THE INVENTION

The flexible trim strip of this invention is a composite of layers which together give a distinct decorative article. The trim strip is especially useful for application to the exterior of an automobile, though other uses are feasible. A variety of decorative effects, all with enhanced depth of vision and improved aesthetics, is possible. The individual layers which form the trim strip composite are described in detail below as well as methods of production.

With reference of FIGS. 1–3, there is shown trim strip 10. The trim strip is flexible so as to readily conform to a contoured exterior body surface of an automobile. It can be produced in virtually any shape or size, dictated only by the substrate to which it will be applied. As shown, the trim strip is generally long and narrow. Additionally, the trim strip is thin due to its intended use as a decorative article. Preferably, the total thickness of the trim strip is less than about 1.0 mm to about 2.0 mm.

Core 11 of the trim strip is an elongated body made from a plastic material, preferably a thermoplastic material. The plastic material must have a good combination of strength, toughness and dimensional stability over a wide range of temperatures. Polyester, acrylonitrile-butadiene styrene terpolymer, polyvinyl chloride, cellulose butyrate, polycarbonate and acrylic films are examples of plastics which can be used. A biaxially oriented polyethylene terephalate film is a highly preferred material for use in producing the core. The elongated core is optimally formed by extrusion, though other plastic processing techniques can be used. The core is desirably transparent or at least translucent. Preferably it is colorless; however, various dyes and pigments can be included in the core to give desired coloring effects to the trim strip. As apparent in the drawings, the plastic core has a substantially flat bottom surface and a substantially flat top surface.

The bottom surface of core 11 is covered by an opaque layer which may be patterned. Several different patterns and methods of providing the pattern can be used depending on the particular appearance desired. As explained in detail below, the opaque layer is partially visible through the transparent or translucent core and overlying layers. The opaque layer in effect acts as a visual background.

One technique used to provide the opaque pattern which is shown in FIGS. 1-3 requires that the underside of the transparent or translucent core 11 be first mechanically abraded to form a roughed surface 12. Next, a metal layer 13 is formed on the abraded surface. Preferably, the metal layer is a vapor deposited aluminum having a thickness sufficient to be opaque. Commerically available vacuum deposition apparatus is used. The abraded surface with metal layer together may give the appearance of for example an engine-turn pattern to the underside.

Embossing the underside surface of transparent or translucent core 11 has the same effect as the aforedescribed abrading procedure. A heated embossing roll imparts any desired pattern to the core's underside. An engine-turn pattern and a brushed metal pattern are two examples of popular visual decorative patterns. Other designs such as a diffraction grating, spiral diffraction grating as well as several other designs known to those skilled in the art can as well be used here. Subsequent depositing of a metal layer will result in an opaque patterned layer of varied metallic-like appearances.

Still other way to provide an opaque patterned layer can be utilized. For example, instead of abrading or embossing the underside of transparent or translucent core 11, the same visual effect can be achieved by first applying to the underside of core 11 an adhesive primer and then a UV curable coating. This coating is then mechanically abraded or embossed. A metal layer is subsequently applied as aforedescribed to provide a very similar opqaue patterned area, such as an engine-turn or a brushed metal appearance.

An ink printing can be substituted for the metal layer in the above described embodiments to provide the needed opacity. If needed, the transparent or translucent core's bottom surface is first given an ink receptive coating. Thereafter, any desired pattern, e.g., a woodgrain effect, is printed thereon. The opaque layer may also be simply a painted or printed layer.

The trim strip 10 also has an adhesive covering the bottom surface of the opaque layer to facilitate application of the trim strip to the automobile body. A pressure sensitive adhesive layer 14 is shown in FIGS. 1 and 2. Such adhesives are commercially available and widely used. Preferably, a release liner 15 is used to protect the adhesive 14 after production and prior to use. Wax paper and silicone release paper are commonly used for this purpose. Other adhesives such as a heat activated adhesive can as well be used.

The top surface of transparent or translucent core 11 has a thin metal layer 16 covering it. Metal layer 16 has a mirror-like appearance. With selected portions removed both a mirror-like and patterned surface having an appearance of depth is provided. A foil may be hot stamped or, preferably, sufficient metal (e.g., aluminum) may vapor deposited on the core's top surfaces to form the thinmetal layer. Next, portions of the metal layer may be removed by etching, the purpose being to reveal the opaque layer 12 through the transparent or translucent core 11. To accomplish this, a resist may be applied to those portions of the metal layer to be retained and then the etchant applied to remove the unprotected metal portions. When viewed from above, there is seen a substrate with portions of the mirror-like metal appearance and patterned portions of the underlying opaque layer. It is this substrate to which the clear plastic lens cap is applied.

Thus, a transparent plastic overlay 17 is applied in a manner to cover the thin metal layer 16 and result in radiused edges 18. Such edges are best seen in FIG. 2. The overlay is preferably applied by casting a sufficient, though precisely controlled, amount of liquid plastic on the metal layer to cause it to flow to the composite's edges where is stops and forms a positive meniscus. The liquid plastic overlay may be cured to a solid by application of heat or irradiation.

The plastic overlay must possess a number of physical properties based on its expected use and exposure. Thus, the overlay is ideally weather-resistant, non-yellowing, abrasion-resistant and impact resistant. Additionally, the plastic overlay should be flexible given the requirement the trim strip itself is flexible. A highly preferred plastic material having a good blend of all the aforementioned properties is a polyurethane. Various known polyol and polyisocyanate reactants are used to form the polyurethane. One polyurethane that is particularly useful is the reaction product of (A) a mixture of a polyester glycol and low to medium molecular weight polypropylenetriols and (B) and aliphatic diisocyanate-polypropylenetriol adduct. After mixing (A) and (B) the mixture is cast onto the substrate. The overlay is preferably formed on the substrate in a continuous flow coating procedure.

The shape of the overlay is such that it imparts a lens effect to the trim strip. That is, the curvature of the edges optically enhances the decorative surface when viewed through the overlay. An enhanced depth of vision of the trim strip results from the clear plastic lens cap which materially adds to the appeal of the underlying layers in an unexpected manner.

In a highly preferred embodiment, opaque graphics such as letters and numerals are applied on the mirror-like metal layer prior to the plastic overlay being formed thereon. The graphics are applied either before or after the etching step. In the former case, it may be necessary to also protect the graphics from the etchant by a covering of a resist. FIGS. 4 and 5 illustrate the use of graphics. The bottom surface of transparent or translucent plastic core 20 is covered with adhesive primer 21 and a UV curable coating 22. The surface of the coating 22 is abraded and has a metal 23 deposited on the abraded surface in a manner as described with reference to FIGS. 1-3. The same engine-turn look is obtained when viewed directly through the transparent or translucent core 20. A thin metal layer 24 with a mirror-like appearance covers the top surface of transparent or translucent core 20. Graphics in the form of letters 25 are printed onto the thin metal layer 24. The graphics are overprinted with a thin covering of a transparent resist 26 as are striped portions of the thin metal layer. The transparent resist 26 may be screen or film overlay applied and serve not only as a resist but also may be tinted "transparent colors" to further enhance the aesthetics of the overall design. Alternatively, a separate tinted "transparent colors" background may be applied before or after application of the graphics, but in any event at least before the etching step. Subsequent application of an etchant removes the unprotected metal. Transparent plastic overlay 27 with radiused edges is formed as a top surface of the trim strip in the manner described above. Adhesive 28 covers the bottom of the trim strip.

The trim strip of FIGS. 4 and 5 is an especially visually attractive product. As viewed directly, a three-dimensional effect is given with three distinct layers. Thus, there appears a top layer of letters 25, a mid layer of mirror-like metal strips 24, and a bottom layer of an engine-turn metal appearance as background. Each layer is visually perceived as a separate layer of a different depth.

The following example illustrates the invention.

EXAMPLE

The trim strip of this example has a engine-turn metal background appearance with overlying highly polished metal stripes. Colored graphics, having a "transparent colors" overlay, on top of the metal strips provide added visuals. The visually perceptive portions of the trim strip have a three dimensional appearance in one plane when viewed directly which substantially enhances the appearance of the trim strip.

A substrate with desired mirror-like and patterned surface is initially provided by the following steps:

1. An engine-turn design is etched into a cylinder, much the same as a gravure print cylinder.
2. A clear polyester carrier sheet is primed with an adhesion promoting primer.
3. A UV curable liquid coating is then metered onto the primed side of the polyester sheet.
4. The combination is carried into a nip over image cylinder where pressure is applied to the film forcing the liquid into the etching.
5. The liquid is then set in place by UV irradiation through the clear sheet.
6. The sheet is then stripped from the cylinder so as to yield a clear polyester sheet with an embossed bottom surface.
7. An aluminum layer is then vapor deposited on the embossed bottom surface and another aluminum layer vapor deposited the top surface. The embossing and aluminum vapor deposition steps on the bottom surface of the substrate give an engine-turn appearance. The aluminum deposited on the top surface gives a highly polished mirror-like appearance.
8. Portions of the mirror-like metal layer not protected by a transparent resist are removed by etchant.
9. The substrate also has an acrylic pressure-sensitive adhesive and a silicone-treated polyester liner laminated to the bottom surface.

The aforedescribed substrate is greatly enhanced visually by a plastic overlay. The substrate is initially given a set of graphics by printing or colored, such as black, letters directly onto the substrate's top surface having the mirror-like metal layer. The graphics are preferably applied prior to step 8 listed above and have a transparent resist applied thereover prior to etching as in step 8. Thereafter, a liquid composition comprised of polyol and polyisocyanate reactants is cast onto the substrate's top surface as the substrate is held flat and horizontal. The liquid flows to the edges. Surface tension of the liquid composition causes it to not overflow, but rather form a positive meniscus at the edges. The liquid composition is caused to set by heating at 140° F. to form a transparent urethane overlay with radiused edges. The plastic overlay adds enhanced of vision to the trim strip by providing a lens effect. The overall appearance of the trim strip is very striking and quite unexpected.

While the invention has been described in detail with respect to the drawings, various modifications can be made. All variations and modifications can be made. All variations and modifications of an obvious nature made to the trim strip are within the scope of the appended claims.

What is claimed is:

1. A flexible trim strip especially useful for application to the exterior or interior of an automobile to provide a decorative surface with an enhanced depth of vision, said flexible trim strip comprising a layered composite of:
    (a) an elongated transparent or translucent core of a plastic material having a substantially flat top surface and a substantially flat bottom surface;
    (b) an opaque layer covering the bottom surface of the transparent core;
    (c) an adhesive layer covering the opaque layer, said adhesive layer capable of adhering to the exterior of an automobile for a prolonged time;
    (d) a thin metal layer having a mirror-like appearance covering the top surface of the transparent or translucent core, said metal layer when selected portions are removed providing a surface with both a miror-like and patterned appearance; and
    (e) a transparent plastic overlay covering the thin metal layer, said overlay characterized in having radiused edges so as to give enhanced depth of vision to the trim strip by creating a lens effect and providing a three dimensional appearance thereto.

2. The flexible trim strip of claim 1 wherein a design is formed on the bottom surface of said transparent or translucent core to provide said opaque layer.

3. The flexible trim strip of claim 2 wherein said design is embossed on the bottom surface of said transparent or translucent core.

4. The flexible trim strip of claim 3 wherein a metal layer is applied over said embossing.

5. The flexible trim strip of claim 1 wherein said transparent or translucent core is made of a dimensionally stable thermoplastic plastic material.

6. The flexible trim strip of claim 5 wherein said transparent or translucent core is made of a biaxially-oriented polyethylene terephthalate plastic material.

7. The flexible trim strip of claim 6 further having graphics on said thin metal layer such that upon viewing the trip strip there is seen the graphics, remaining portions of the thin metal layer having both a mirror-like appearance and a patterned appearance.

8. The flexible trim strip of claim 7 wherein said plastic overlay is a flexible, weather and abrasion resistant polyurethane.

9. The flexible trim strip of claim 8 wherein the adhesive layer has an overlying release film capable of protecting the adhesive layer during storage, but readily removed to expose the adhesive for application.

10. The flexible trim strip of claim 7 wherein said graphics are colored and wherein said graphics have a transparent resist applied thereover.

11. The flexible trim strip of claim 10 wherein said transparent resist is screen applied and aids in the appearance of said graphics.

12. The flexible trim strip of claim 7 having tinted transparent colors over said thin metal layer and beneath said graphics.

13. The flexible trim strip of claim 1 wherein said thin metal layer is a vapor deposited aluminum.

14. The flexible trim strip of claim 1 wherein said trim strip's thickness is less than about 2.5 mm.

15. The flexible trim strip of claim 11 wherein said trim strip's thickness ranges from about 1.0 mm to about 2.0 mm.

* * * * *